(12) United States Patent
Ishikawa et al.

(10) Patent No.: US 10,578,750 B2
(45) Date of Patent: Mar. 3, 2020

(54) LABR3 SCINTILLATION DETECTOR AND SPECIFIC EVENT REMOVAL METHOD

(71) Applicant: National University Corporation Hokkaido University, Sapporo-shi, Hokkaido (JP)

(72) Inventors: Masayori Ishikawa, Sapporo (JP); Ryo Ogawara, Sapporo (JP)

(73) Assignee: National University Corporation Hokkaido University, Sapporo-shi, Hokkaido (JP)

(*) Notice: Subject to any disclaimer, the term of this patent is extended or adjusted under 35 U.S.C. 154(b) by 13 days.

(21) Appl. No.: 15/552,645

(22) PCT Filed: Feb. 10, 2016

(86) PCT No.: PCT/JP2016/054017
§ 371 (c)(1),
(2) Date: Dec. 4, 2017

(87) PCT Pub. No.: WO2016/136480
PCT Pub. Date: Sep. 1, 2016

(65) Prior Publication Data
US 2018/0149760 A1    May 31, 2018

(30) Foreign Application Priority Data
Feb. 25, 2015   (JP) .................. 2015-035788

(51) Int. Cl.
*G01T 1/20*   (2006.01)
*G01T 1/17*   (2006.01)
(Continued)

(52) U.S. Cl.
CPC ............ *G01T 1/20* (2013.01); *C01F 17/0056* (2013.01); *C09K 11/7704* (2013.01); *G01T 1/17* (2013.01); *C09K 11/00* (2013.01)

(58) Field of Classification Search
CPC ......... G01T 1/20; G01T 1/17; C09K 11/7704; C01F 17/0056
See application file for complete search history.

(56) References Cited

U.S. PATENT DOCUMENTS 4,217,496 A * 8/1980 Daniels ................... G01T 3/00
                                                          250/369
6,953,937 B2   10/2005 Reber
(Continued)

FOREIGN PATENT DOCUMENTS

GB           2484393           4/2012

OTHER PUBLICATIONS

Ortec® Lanthanum Bromide Scintillation Detectors Catalog 4 pages. (Year: 2009).*
(Continued)

*Primary Examiner* — David P Porta
*Assistant Examiner* — Shun Lee
(74) *Attorney, Agent, or Firm* — Nixon Peabody LLP

(57) ABSTRACT

The present invention identifies α decay and other events included in the emission of an LaBr₃ scintillator and only collects γ ray events. An LaBr₃ scintillation detector is provided with an LaBr3 scintillator 10, a photomultiplier tube 12, an oscilloscope 14, and a computer 18. The computer 18 detects a peak value Vp and a total charge amount $Q_{total}$ of a voltage waveform signal and calculates an error propagation expression function for a ratio of the peak value Vp to the total charge amount $Q_{total}$. This error propagation expression function is used as a threshold function for identifying and removing α decay events. The α decay events are identified from the peak value Vp and total charge amount $Q_{total}$, which are measurement values that can be measured in real time.

8 Claims, 8 Drawing Sheets

(51) Int. Cl.
*C01F 17/00* (2020.01)
*C09K 11/77* (2006.01)
*C09K 11/00* (2006.01)

(56) References Cited

U.S. PATENT DOCUMENTS

2007/0290136 A1* 12/2007 Ivan .................... G01T 1/17
 250/361 R
2014/0027646 A1 1/2014 Zaitseva

OTHER PUBLICATIONS

Lintereur et al. Neutron and gamma ray pulse shape discrimination with Polyvinyltoluene, PNNL-21609, 37 pages. (Year: 2012).*
Hellesen et al. Impact of digitization for timing and pulse shape analysis of scintillator detector signals, Nuclear Instruments and Methods in Physics Research A vol. 720, pp. 135-140 (Year: 2013).*
McGregor, Materials for Gamma-Ray Spectrometers: Inorganic Scintillators, Annual Review of Materials Research vol. 48, pp. 245-277 (Year: 2018).*
Yang et al. Enhanced α-γ discrimination in co-doped LaBr3:Ce, 2014 IEEE Nuclear Science Symposium and Medical Imaging Conference, 5 pages (Year: 2014).*
Extended European Search Report for Application No. EP 16755227.2, dated Sep. 27, 2018 (10 pages).
Feng, P. et al.; "Pulse-Shape Discrimination in High-Symmetry Organic Scintillators"; IEEE Transactions on Nuclear Science; IEEE Service Center, New York, New York; vol. 60, No. 4, pp. 3142-3149; Aug. 1, 2013; XP011526242 (8 pages).

Nicolini, R. et al.; "Investigation of the properties of a 1'×1' LaBr3:Ce scintillator"; Nuclear Instruments & Methods in Physics Research, Section A, Elsevier BV; vol. 582, No. 2, pp. 554-561; Oct. 25, 2007; XP022313972 (8 pages).
Ku, H. H.; "Notes on the Use of Propagation of Error Formula"; Journal of Research of the National Bureau of Standards—C. Engineering and Instrumentation; May 27, 1966, pp. 263-273; XP55507033 (11 pages).
Hoel, C. et al., "Pulse-Shape Discrimination of La Halilde Scintillators," Nuclear Instruments & Methods in Physics Research A, Dec. 6, 2004. vol. 540 (pp. 205-208).
Milbrath, B.D. et al., "Characterization of Alpha Contamination in Lanthanum Trichloride Scintillators Using Coincidence Measurements," Nuclear Instruments & Methods in Physics Research A, May 23, 2005, vol. 547 (pp. 504-510).
Chandrikamohan, Pramoth et al., "Comparison of Pulse Shape Discrimination Methods for Phoswich and CsI:Tl Detectors," IEEE Transactions on Nuclear Science, Apr. 2007, vol. 54, No. 2, (pp. 398-403).
Crespi, F.C.L. et al., "Alpha-Gamma Discrimination by Pulse Shape in $LaBr_3$:Ce and $LaCl_3$:Ce," Nuclear Instruments and Methods in Physics Research A, Feb. 3, 2009, vol. 602 (pp. 520-524).
International Search Report in International Application No. PCT/JP2016/054017, dated May 10, 2016 (5 pages) (with translation).
Written Opinion in International Application No. PCT/JP2016/054017, dated May 10, 2016 (7 pages) (with translation).
European Office Action dated Nov. 15, 2019 (8 pages).
Lintereur, A. et al., "Neutron and Gamma Ray Pulse Shape Discrimination with Polyvinyltoluene," Pacific Northwest National Laboratory, Mar. 2012; PNNL-21609 (37 pages).

* cited by examiner

LABR3 SCINTILLATION DETECTOR AND SPECIFIC EVENT REMOVAL METHOD

TECHNICAL FIELD

The present disclosure relates to an $LaBr_3$ scintillation detector and rejection of specific events such as an α decay event caused by the self-radioactivity of the scintillation detector itself.

BACKGROUND

In recent years, research and development of inorganic scintillators have been rapidly progressed, and the performance of the inorganic scintillators has dramatically improved. Amongst them, an $LaBr_3$ scintillator is excellent not only in time resolution but also in energy resolution, and has characteristics of 3% or less with respect to γ rays of Cs-137 (662 KeV). In addition, it is possible to prepare large crystals, and a measurement with high detection efficiency may be expected by increasing a peak-to-Compton ratio. The effective atomic number of the $LaBr_3$ scintillator is somewhat low. However, because of the high density of 5.3 $g/cm^3$, the $LaBr_3$ scintillator is suitable for measurement of high energy γ rays, and attracts attention as an alternative detector to a high purity Ge detector.

Meanwhile, since the $LaBr_3$ scintillator has γ rays (1,436 keV) from $^{138}La$ as self-radioactivity and residual radioactivity of $^{227}Ac$ series (releasing α rays of 5 to 6 MeV), the self-radioactivity causes a large measurement error in the measurement of γ rays of low activity. In particular, since there is a spectrum associated with α decay in a region corresponding to 1.7 to 2.4 MeV, the characteristics of the $LaBr_3$ scintillator may not be fully utilized in the high energy γ ray region.

FIG. 12 is a self-radioactivity spectrum of $LaBr_3:Ce$. In the figure, the horizontal axis represents energy (MeV) and the vertical axis represents event frequency. It can be seen that there are many spectra associated with α decay at 1.7 to 2.4 MeV. When an event to be measured is other than 1.5 to 2.5 MeV, it is considered that the background (BG) of α decay is not a particular problem, but a large amount of environmental radiation or a large number of nuclear reactions are distributed, which may be problematic because they often have a low counting rate.

Although it may be considered that it is sufficient to simply subtract the background (BG) of α decay, it takes time to obtain sufficient statistics in the event of a low counting rate. In addition, since the detection efficiency for high energy gamma rays is generally low, the counting rate is often low.

Non Patent Document 1 below describes a method of rejecting α ray events by comparing a partial charge amount and a total charge amount using a difference in an emission signal of an $LaBr_3$ scintillator between γ ray events and the α ray events.

CITATION LIST

Non Patent Literature

[Non Patent Document 1] "Alpha-Gamma discrimination by pulse shape in $LaBr_3:Ce$ and $LaCl_3:Ce$" F. C. L. Crespi et al., Nucl. Instr. Meth. A 602, 2009

SUMMARY

Technical Problem

However, in the above-described conventional method, it is necessary to prepare an arbitrary integration window near a peak of a waveform and obtain a partial integrated charge in the region. Thus, there is a problem in that the measurement result varies depending on the setting of the analysis range (integration window).

In addition, since a threshold for identifying the γ ray events and the α ray events is artificially set, there is a problem that the identification accuracy varies depending on the setting.

An object of the present disclosure is to provide a device capable of detecting mainly a spectrum (b) of only γ ray events from a spectrum (a) detected including a specific event such as α decay events, as schematically illustrated in FIG. 13, by identifying the specific events such as the α decay events using a measured value which may be actually measured in real time such as a signal peak voltage and a total charge amount in an $LaBr_3$ scintillator.

Solution to Problem

The present disclosure includes: an $LaBr_3$ scintillator; a photoelectric converter that converts light emitted from the $LaBr_3$ scintillator into an electric signal; a waveform signal output unit that converts an output from the photoelectric converter into a voltage waveform signal; a detecting unit that detects a peak value $V_p$ and a total charge amount $Q_{total}$ of the voltage waveform signal; a calculating unit that calculates an error propagation expression function of a ratio of the peak value $V_p$ and the total charge amount $Q_{total}$; and a processing unit that uses the error propagation expression function as a threshold function to specify and reject an event other than γ ray events.

The present inventors analyzed the ratio of the peak value $V_p$ and the total charge amount (integrated charge amount) $Q_{total}$ of the voltage waveform signal for data of a predetermined number of events of emission signals attributable to self-radioactivity of the $LaBr_3$ scintillator, and found that only α decay event exhibited a significantly different distribution. Therefore, an error propagation expression function of the ratio of $V_p$ and $Q_{total}$ is calculated in an energy range of a predetermined value or less which does not include an event other than γ rays in light emitted from the scintillator, and the function is used as a threshold function to identify data of a specific event such as an α decay event that exhibits a significantly different distribution. Then, the data of the specific event are rejected from the original data.

An exemplary embodiment of the present disclosure further includes a low-pass filter that removes a high frequency component of the voltage waveform signal output from the waveform signal output unit.

In another exemplary embodiment of the present disclosure, the calculating unit calculates a standard deviation by correcting the peak value $V_p$ detected by the detector to become linear with respect to the total charge amount $Q_{total}$.

In still another exemplary embodiment of the present disclosure, the calculating unit calculates the error propagation expression function in an energy range of 1.5 MeV or less.

In yet another exemplary embodiment of the present disclosure, the processing unit uses an error propagation expression function of 3σ as the threshold function.

In still yet another exemplary embodiment of the present disclosure, the ratio of the peak value $V_p$ to the total charge amount $Q_{total}$ is $V_p/Q_{total}$.

Further, the present disclosure includes a method of rejecting a specific event of an LaBr$_3$ scintillator, the method including: converting an emission of the LaBr$_3$ scintillator into a voltage waveform signal and outputting the voltage waveform signal; detecting a peak value $V_p$ and a total charge amount $Q_{total}$ of the voltage waveform signal; calculating a standard deviation of a ratio of the peak value $V_p$ and the total charge amount $Q_{total}$ and calculating an error propagation expression function of the standard deviation in an energy range of a predetermined value or less which does not include an event other than γ ray light emitted from the scintillator; and specifying an event in an energy range of the predetermined value or more using the error propagation expression function as a threshold function and rejecting the event.

Advantageous Effects of Invention

According to the present disclosure, a specific event (e.g., an α decay event of self-radioactivity) may be identified and rejected by using measured values measurable in real time such as a peak voltage and a total charge amount of a signal in an LaBr$_3$ scintillator. Therefore, according to the present disclosure, it is possible to perform detection with high accuracy by utilizing the characteristics of the LaBr$_3$ scintillator particularly in a high energy γ ray region corresponding to 1.5 to 3 MeV.

DESCRIPTION OF EMBODIMENTS

Hereinafter, embodiments of the present disclosure will be described.

<Overall Configuration>

Figure 1:
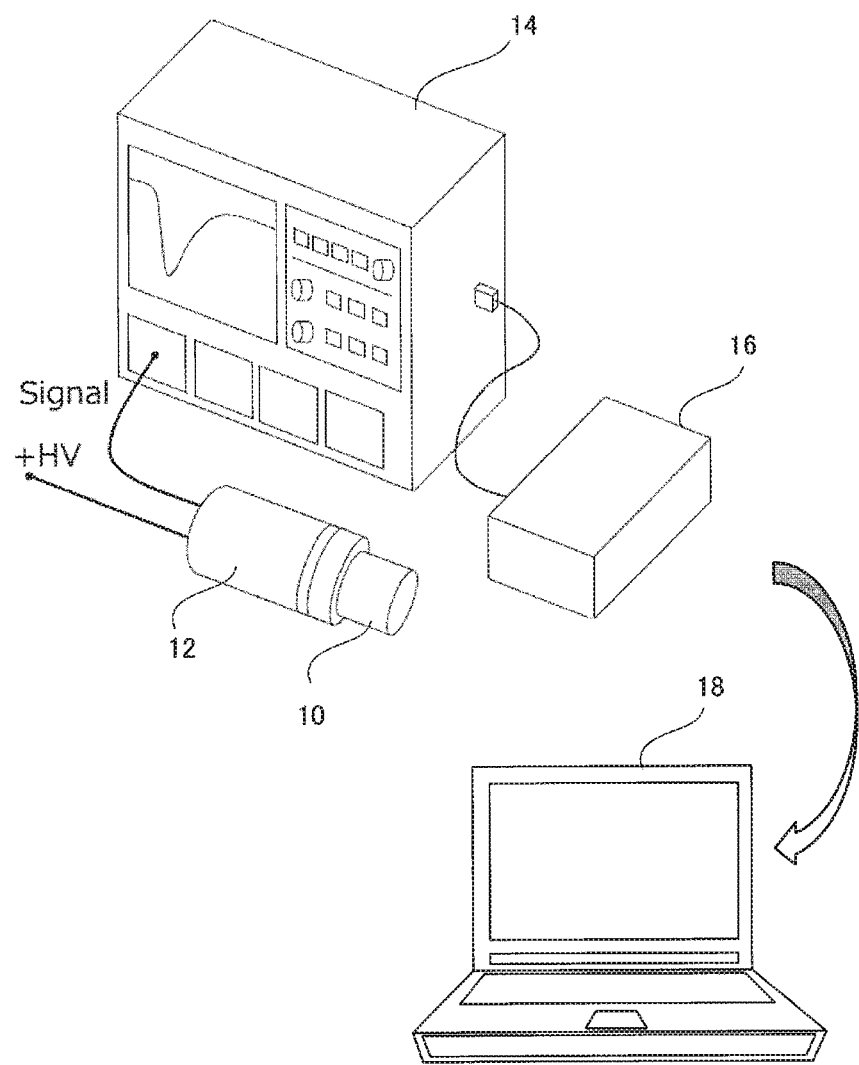
FIG. 1 is a configuration diagram of a scintillation detector of an exemplary embodiment.

FIG. 1 is a configuration diagram of a scintillation detector of an exemplary embodiment. The scintillation detector includes an LaBr$_3$:Ce scintillator 10, a photomultiplier 12, an oscilloscope 14, a hard disk drive 16, and a computer 18.

The LaBr$_3$:Ce scintillator 10 is a scintillator that converts ionizing radiation such as a γ ray into light, and is formed, for example, in a cylindrical shape of 1.5 inch φ×1.5 inch. The LaBr$_3$:Ce scintillator 10 is a scintillator that is excellent in stopping power, energy resolution, and time resolution, but as described above, it always outputs a background signal according to a radionuclide contained therein.

The photomultiplier tube 12 is connected to the LaBr$_3$:Ce scintillator 10 so as to convert the light of the LaBr$_3$:Ce scintillator 10 into an electrical signal corresponding to the intensity and output the electrical signal.

The oscilloscope 14 converts the detected electric signal into a voltage signal (waveform signal) along the time axis and outputs the voltage signal.

The hard disk drive 16 is connected to the oscilloscope 14 via a USB interface or the like, and stores the waveform signal (raw waveform signal not subjected to waveform shaping or the like) output from the oscilloscope 14.

The computer 18 functions as a detecting unit, a calculating unit, and a processing unit in the present exemplary embodiment, so that the waveform signal stored in the hard disk drive 16 is input to the computer 18 and the computer 18 analyzes the waveform signal and outputs the analysis result. The computer 18 has a CPU and a program memory, and a predetermined processing program is stored in the program memory. The computer 18 reads the processing program stored in the program memory and sequentially executes the processing program to analyze the waveform signal. The analysis of the waveform signal in the present exemplary embodiment includes the following processes:

(a) a process of filtering the waveform signal (b) a process of detecting a total integrated value $Q_{total}$ of charge and a peak value Vp of the voltage and calculating $V_p/Q_{total}$ (c) a process of determining a threshold function dependent on energy (d) a process of rejecting an α ray event using the threshold function In FIG. 1, the hard disk drive 16 and the computer 18 may be implemented as one waveform analyzing device, and the oscilloscope 14, the hard disk drive 16, and the computer 18 may be implemented as one waveform analyzing device.

Further, the computer 18 may have a function of counting the number of events for data in which the α ray events have been rejected, converting the count value into a radiation dose, and outputting the radiation dose. However, description thereof will be omitted, as this function is well known.

Next, the above-mentioned processes will be described in order.

<Filtering Process>

Figure 2:
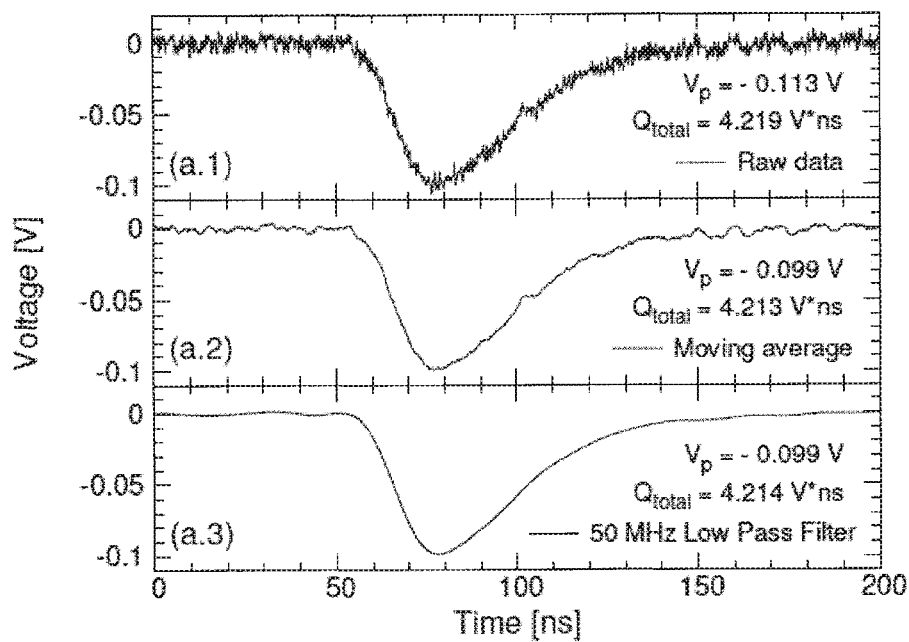
FIG. 2 is a waveform signal diagram of self-radioactivity of an LaBr$_3$:Ce scintillator.

FIG. 2 is a waveform signal diagram measured at events including a self-radioactive event of the LaBr3:Ce scintillator 10. The waveforms are obtained by the oscilloscope 14, and no external radiation source is used. In the figure, the horizontal axis represents time (ns) and the vertical axis represents voltage (V).

The uppermost waveform signal is a waveform signal of raw data, and the following are obtained:

Peak value Vp=−0.113(V)

Total charge amount (total integrated value of charge) $Q_{total}$=4.219

However, the raw data has high noise, and even though $V_p/Q_{total}$ is calculated, its accuracy is low.

The central waveform signal is a waveform signal obtained by performing a moving average process of the raw data with a time width of 2 ns, and following are obtained:

$V_p = -0.099$ (V)

Total charge amount $Q_{total} = 4.213$

The lowermost waveform signal is a waveform signal which is subjected to noise removal by a low-pass filter that removes high frequency noise of 50 MHz or more by FFT and IFFT (inverse FFT), and the following are obtained:

Vp=−0.099 (V)

Total charge amount Qtotal=4.214

The peak value Vp and the total charge amount $Q_{total}$ may be detected with high accuracy by performing a moving average process or a low pass filter process, particularly a low pass filter process to shape the waveform.

In comparison of these three sets of $V_p$ and $Q_{total}$, for $V_p$, the same value is obtained in the moving average process and the low-pass filter process, and a value different from that value is obtained in the raw data. On the other hand, however, for $Q_{total}$, substantially the same value is obtained in the three sets of data. $Q_{total}$ is the total charge amount and corresponds to energy, suggesting that there is no major change in the energy distribution between the three sets of data.

Figure 3:
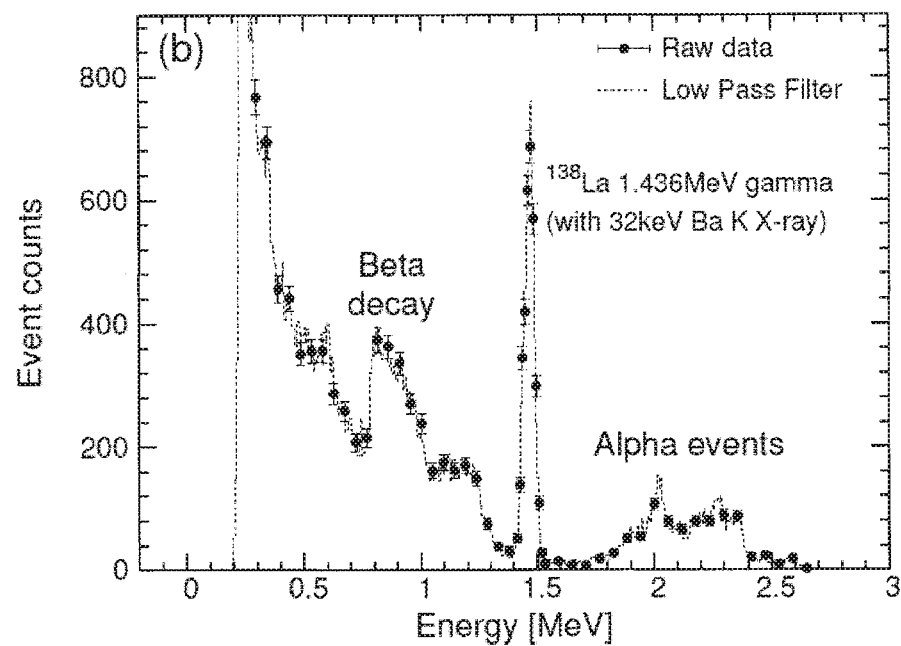
FIG. 3 is an energy spectrum diagram of the LaBr$_3$:Ce scintillator.

FIG. 3 illustrates an energy spectrum of the lowest waveform signal in FIG. 2; that is, an energy spectrum when high-frequency noise is removed by the low-pass filter of FFT and IFFT. The solid line indicates an energy spectrum of the raw data, and the broken line indicates an energy spectrum when low-pass filtered. It can be seen from this figure that the energy spectrum does not change before and after noise removal. This means that data loss does not occur even when the low pass filter process is performed on the raw data.

<Calculating Process of Vp/$Q_{total}$>

Figure 4:
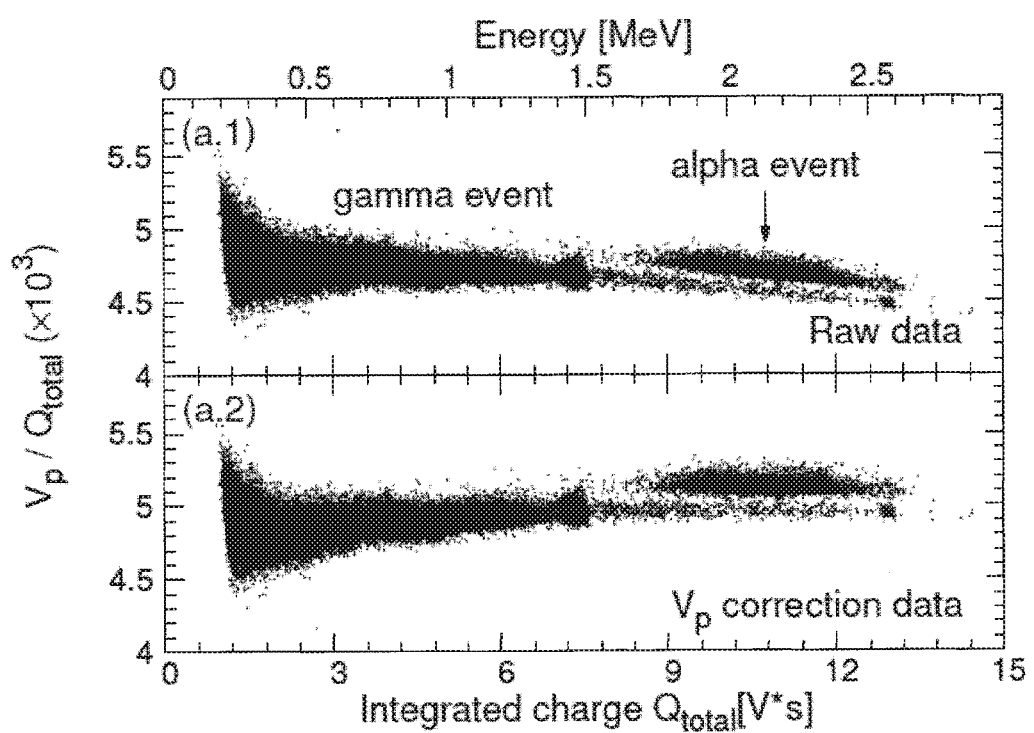
FIG. 4 is a plot of $V_p/Q_{total}$.

FIG. 4 illustrates a plotted result of the ratio Vp/$Q_{total}$ of the peak value Vp and the total charge amount $Q_{total}$ of the waveform signal (low-pass filtered) for the data of 100,000 events of light emission by the self-radioactivity of the $LaBr_3$:Ce scintillator 10. In the figure, the horizontal axis represents the total charge amount $Q_{total}$ and the corresponding energy (MeV), and the vertical axis represents $V_p/Q_{total}$.

As is apparent from part (a. 1) in FIG. 4, two components are present in the energy range of 1.5 to 3 MeV. It is known that the peak value $V_p$ of the waveform signal of α ray events is larger than the peak value of the waveform signal of γ ray events (see the related art). Accordingly, the upper component in part (a. 1) of FIG. 4 corresponds to the α ray events and the lower component corresponds to the γ ray events. The low energy portion is considered to be γ ray events by $^{208}$Tl 2.6 MeV, which is an environmental radionuclide.

Further, since each of $V_p$ and $Q_{total}$ has a linear relationship with respect to energy, the ratio Vp/$Q_{total}$ should be constant in the entire energy range. However, the ratio Vp/$Q_{total}$ is not constant and tends to decrease with increasing energy. This is considered to be due to the saturation of the peak value $V_p$. The present inventors have found that, when plotting the horizontal axis as $Q_{total}$ and the vertical axis as $V_p$, the linearity of $V_p$ and $Q_{total}$ is maintained in the low energy region (1.5 MeV or less), whereas the linearity is not maintained in the high energy region, and $V_p$ tends to be saturated.

Therefore, in order to correct the saturation of $V_p$, a saturation curve of $V_p$ is defined as follows:

$$V_p = \frac{\alpha Q_{total}}{1 + \beta Q_{total}} (\alpha = Const., \beta = Const.) \qquad [Eq. 1]$$

Here, $\alpha Q_{total}$ is a linear term, and $1+\beta Q_{total}$ is a saturation term. Then, assuming that the corrected $V_p$ (taken as $V_{pCorr}$) should be proportional to $Q_{total}$; that is, $V_{pCorr}=\alpha Q_{total}$, $V_p$ is corrected to $V_{pCorr}$ by the following equation:

$$V_{pCorr} = \frac{V_p}{1 - (\alpha/\beta)V_p} \qquad [Eq. 2]$$

In part (a.2) of FIG. 4, a plotted result of $V_p/Q_{total}$ when corrected $V_p$ is used is illustrated. The obtained result is that $V_p/Q_{total}$ using the corrected $V_p$ becomes substantially constant in the entire energy range. Coefficients α and β in the above equation may be determined experimentally.

In FIG. 4, the γ ray events of 1.5 MeV or less have larger variations as the energy is lower, but this is theoretically derived from error propagation. That is, standard deviation $\sigma V_p/Q_{total}$ (hereinafter referred to as σ) of $V_p/Q_{total}$ is:

$$\sigma_{V_p/Q_{total}} = \sqrt{\left(\frac{1}{Q_{total}}\sigma_{V_p}\right)^2 + \left(\frac{V_p}{Q_{total}^2}\sigma_Q\right)^2} \qquad [Eq. 3]$$

The above-described equation may be approximated to the following equation:

$$\sigma_{V_p/Q_{total}} = kQ_{total}^{-1} + l (k=const., l=const.) \qquad [Eq. 4]$$

As is apparent from this equation, the standard deviation $\sigma V_p/Q_{total}$ of $V_p/Q_{total}$ increases with decreasing $Q_{total}$; that is, with decreasing energy.

<Determining Process of Threshold Function>

In FIG. 4, the threshold function for identifying the γ ray events and the α ray events may be determined by using the standard deviation σ of pure γ ray events of 1.5 MeV or less.

Figure 5:
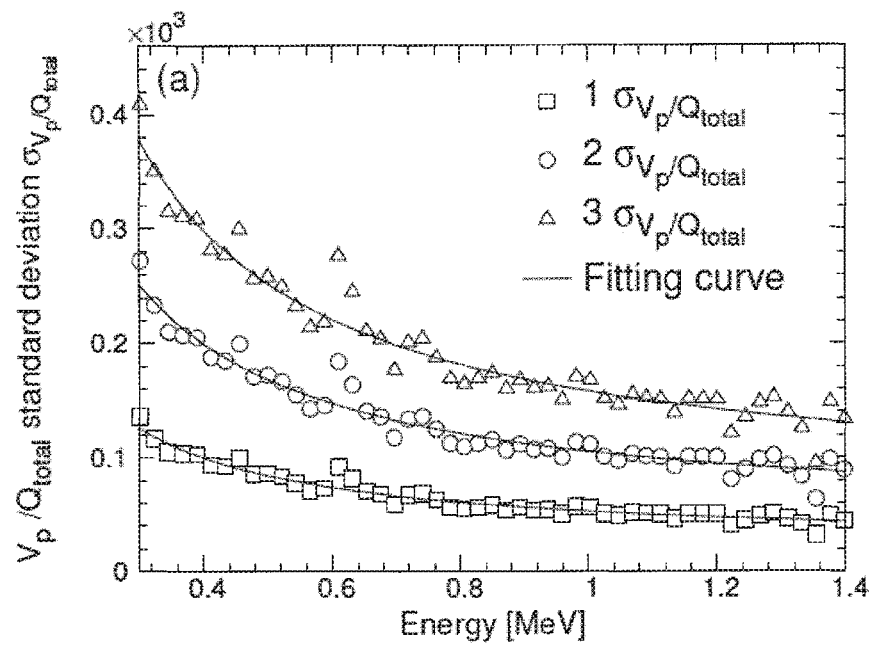
FIG. 5 is a diagram illustrating a standard deviation $\sigma_{Vp/Qtotal}$ of $V_p/Q_{total}$ and an error propagation expression function.

FIG. 5 illustrates σ, 2σ, and 3σ calculated for $V_p/Q_{total}$ using the corrected $V_p$, and its error propagation expression function. In the figure, the horizontal axis represents energy, which is an energy range of 1.4 MeV or less (i.e., an energy range of only the γ ray events), and the vertical axis represents the standard deviation σ of $V_p/Q_{total}$. From this figure, it can be seen that the variation of $V_p/Q_{total}$ is very well reproduced by the error propagation expression function. Therefore, the α ray events present in the energy range of 1.5 MeV or more may be clearly identified by determining the threshold function from this error propagation expression function.

Figure 6:
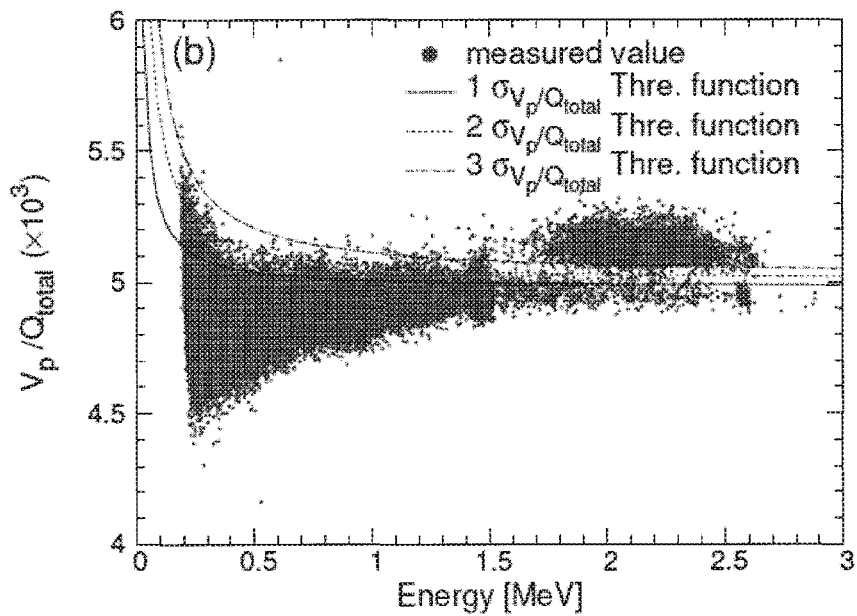
FIG. 6 is a diagram in which a threshold function is applied to FIG. 4.

FIG. 6 is a diagram in which the threshold function is applied to the plotting of $V_p/Q_{total}$ using the corrected $V_p$ illustrated in part (a.2) of FIG. 4. The threshold function is inversely proportional to $Q_{total}$ and represents energy dependence. The threshold functions of σ, 2σ, and 3σ are illustrated in the figure, but the γ ray events and the α ray events may be clearly identified, especially by using the threshold function of 3σ. Therefore, it is possible to reject the α ray events using the threshold function.

It should be noted that the threshold functions of σ to 3σ are unambiguously and objectively determined from the data group of $V_p/Q_{total}$ at 1.5 MeV or less.

<Rejection Process of α Ray Events>

Figure 7:
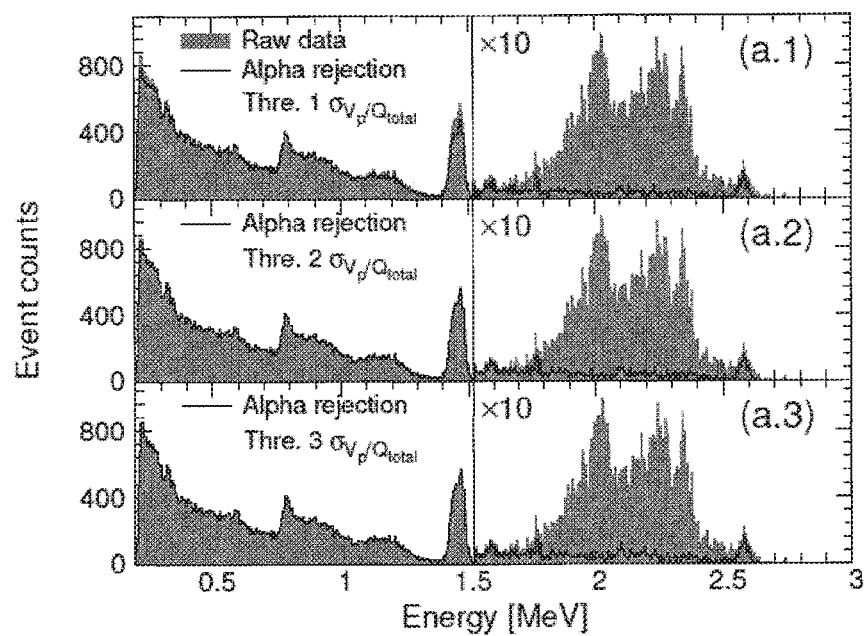
FIG. 7 is a diagram illustrating a result of rejecting an α ray event.

FIG. 7 is a diagram illustrating the result of rejecting the α ray events using three kinds of threshold functions (threshold functions of σ, 2σ, and 3σ). In the figure, part (a.1) is a result when the threshold function of σ is used, part (a.2) is a result when the threshold function of 2σ is used, and part (a.3) is a result when the threshold function of 3σ is used. In the figure, the horizontal axis represents energy (MeV), and the vertical axis represents event counts. In the case of the energy range of 1.5 MeV or more, the event counts are magnified by a factor often times. In the energy range of 1.5 MeV and more, the solid line indicates event counts after the α ray events are rejected, and the α ray events are rejected in all the threshold functions.

Figure 8:
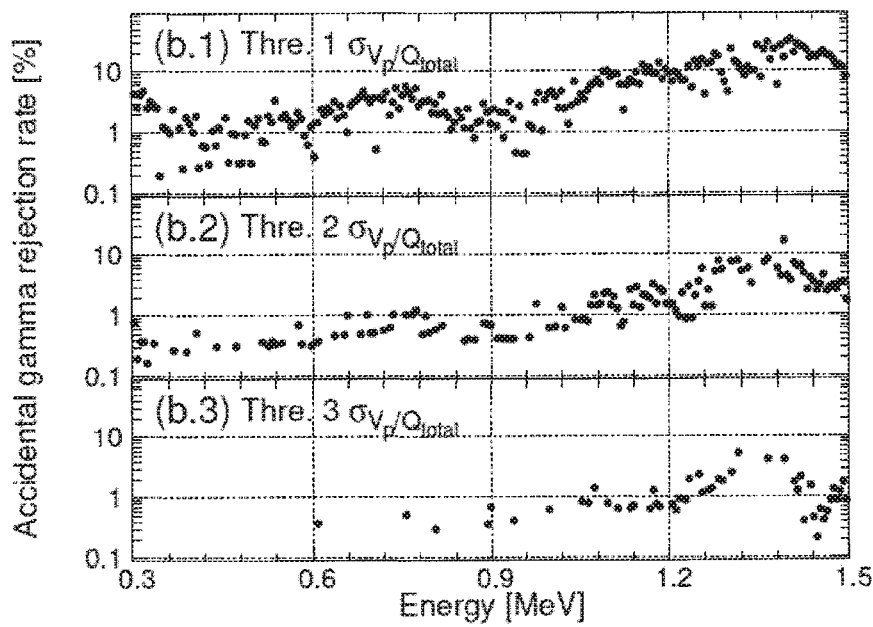
FIG. 8 is a diagram illustrating an accidental rejection rate of an γ ray event.

FIG. 8 is a diagram illustrating an accidental rejection rate of the γ ray events: that is, a rejection rate of the γ ray events that should not be rejected, in each of the three kinds of threshold functions. In the figure, the horizontal axis represents energy in a range of 0.3 MeV to 1.5 MeV; that is, an energy range in which only the γ ray events occur. It is understood that as the threshold function becomes larger in the manner of σ, 2σ, and 3σ, the accidental rejection rate decreases drastically, so that only the α ray events are correctly rejected. Specifically, when the threshold function of 3σ is used, the accidental rejection rate is approximately 1% or less in the whole region of 1.5 MeV or less, and as a whole, the accidental rejection rate of about 0.716% is obtained. In other words, in this exemplary embodiment, it is not meant that the γ ray events are not eliminated at all, but it is meant that the γ ray events may be somewhat rejected.

As described above, it is possible to determine a threshold function for identifying α ray events using only the self-radioactivity of the $LaBr_3$:Ce scintillator 10. In addition, since the threshold function has a mathematical basis and does not include parameters to be set artificially, it may be determined unambiguously and objectively. Specifically, when the threshold function is determined as a function of energy, it is possible to dramatically improve the accuracy of identifying the α ray events. Furthermore, the accidental rejection rate of the γ ray events of 1.5 MeV or less may be set to about 0.7% by using the threshold function of 3σ.

Next, descriptions will be made on a case where a measurement is performed using an external radiation source, in order to confirm whether or not the α ray events can be rejected correctly.

For example, Ge/Ga-68 ($^{68}$Ga 1.883 MeV) is used as the external radiation source. At this time, since contribution from environmental radiation ($^{208}$Tl 2.61 MeV, etc.) may exist, the α ray events and the γ ray events are mixed in at 1.5 MeV to 3 MeV. Therefore, after the α ray events are rejected using the 3σ threshold function in the above-described method, an evaluation is conducted in order to determine whether or not the correct number of γ ray events ($^{68}$Ga 1.883 MeV), which is previously known, remains.

Specifically, a result obtained by the highly reliable background (BG) subtraction method is compared with the result obtained by the exemplary embodiment, and an evaluation is conducted as to whether or not there is a difference between the two results. That is, by comparing distribution of γ rays of 1.883 MeV remaining after subtracting the measurement result in the absence of an external radiation source from the measurement result in the presence of an external radiation source (background BG subtraction method) and distribution of γ rays of 1.883 MeV remaining after using $V_p/Q_{total}$ and the threshold function of the exemplary embodiment in the presence of an external radiation source, it is evaluated whether the α ray events can be rejected correctly by the method of the exemplary embodiment.

Figure 9:
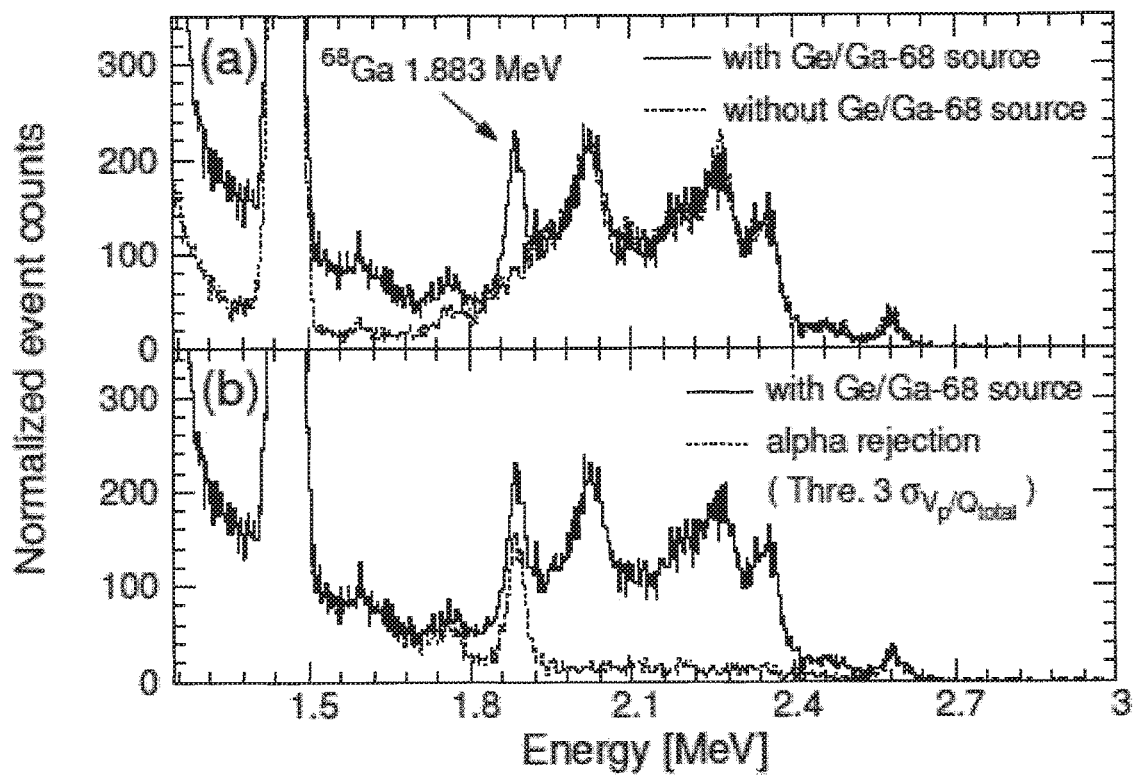
FIG. 9 is a histogram diagram (part 1) of a BG subtraction method using an external radiation source and a method of the exemplary embodiment.

FIG. 9 also illustrates energy spectra with and without an external radiation source. In part (a), the solid line indicates an energy spectrum in the case where an external radiation source is present, the broken line indicates an energy spectrum in the case where an external radiation source is not present, and the vertical axis represents normalized event counts. The event counts of $^{68}$Ga 1.883 MeV may be measured by subtracting the latter from the former.

Meanwhile, part (b) of FIG. 9 illustrates energy spectra in the state where an external radiation source is provided and after the α ray events are rejected by the method of the exemplary embodiment. In part (b), the solid line indicates the energy spectrum in the state where an external radiation source is present, and the broken line indicates the energy spectrum after the α ray events are rejected by the threshold function of 3σ. As illustrated in part (b), even when the α ray events are rejected by the threshold function of 3σ, 1.883 MeV components remain without being rejected.

Figure 10:
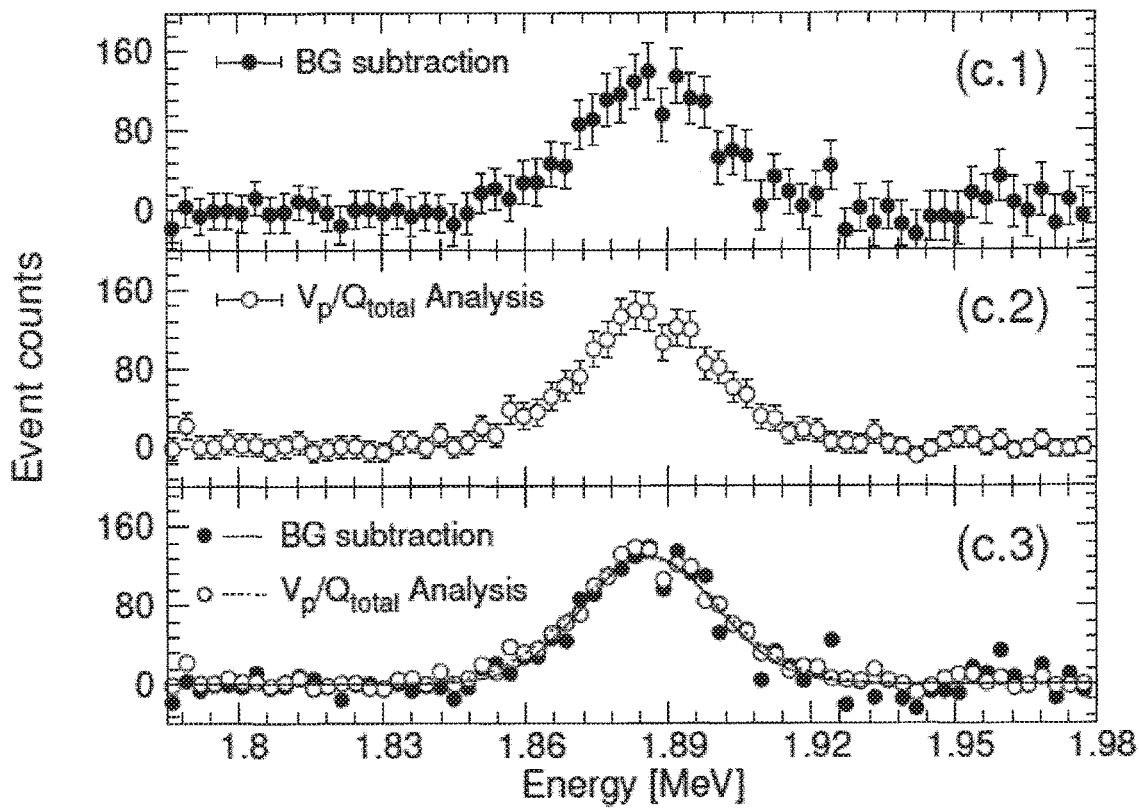
FIG. 10 is a histogram diagram (part 2) of the BG subtraction method using an external radiation source and the method of the exemplary embodiment.

FIG. 10 is a diagram comparing the case of subtracting background (BG) with the case of the exemplary embodiment. The horizontal axis represents energy in the energy range around 1.883 MeV. The vertical axis represents normalized event counts. Part (C.1) is a result of the BG method which is obtained by subtracting the case of not setting an external radiation source from the case of setting an external radiation source, part (c.2) is a result of the present exemplary embodiment, and part (c.3) is a result of comparing the two.

The peak count numbers (including measured value and fitting value), average energy, full width at half maximum (FWHM), and difference in each case are as follows.

Peak Count Number (Measured Value)
BG method: 139.6±28.54
Exemplary embodiment: 138.6±19.22
Difference: 0.716%
Peak Count Number (Fitting Value)
BG method: 129.9±6.34
Exemplary embodiment: 127.7±4.46
Difference: 1.694%
Average Energy (keV)
BG method: 1885.9±0.7334
Exemplary embodiment: 1885.5±0.5281
Difference: 0.021%
FWHM (keV)
BG method: 33.1±3.62 (1.755%)
Exemplary embodiment: 36.2±3.31 (1.920%)
Difference: 0.165%

From the above results, it is understood that in the exemplary embodiment the same result as in the BG method may be obtained with higher accuracy.

In the exemplary embodiment, there may be a counting loss of certain events due to the dead time required to acquire the waveform signal. For example, there may be a counting loss of a $^{215}$Po short-lived daughter nucleus that decays in a cascade manner from $^{219}$Rn and the like. However, since the rejection of the measured events may be reliably executed, this counting loss does not contribute to the accuracy evaluation.

Figure 11:
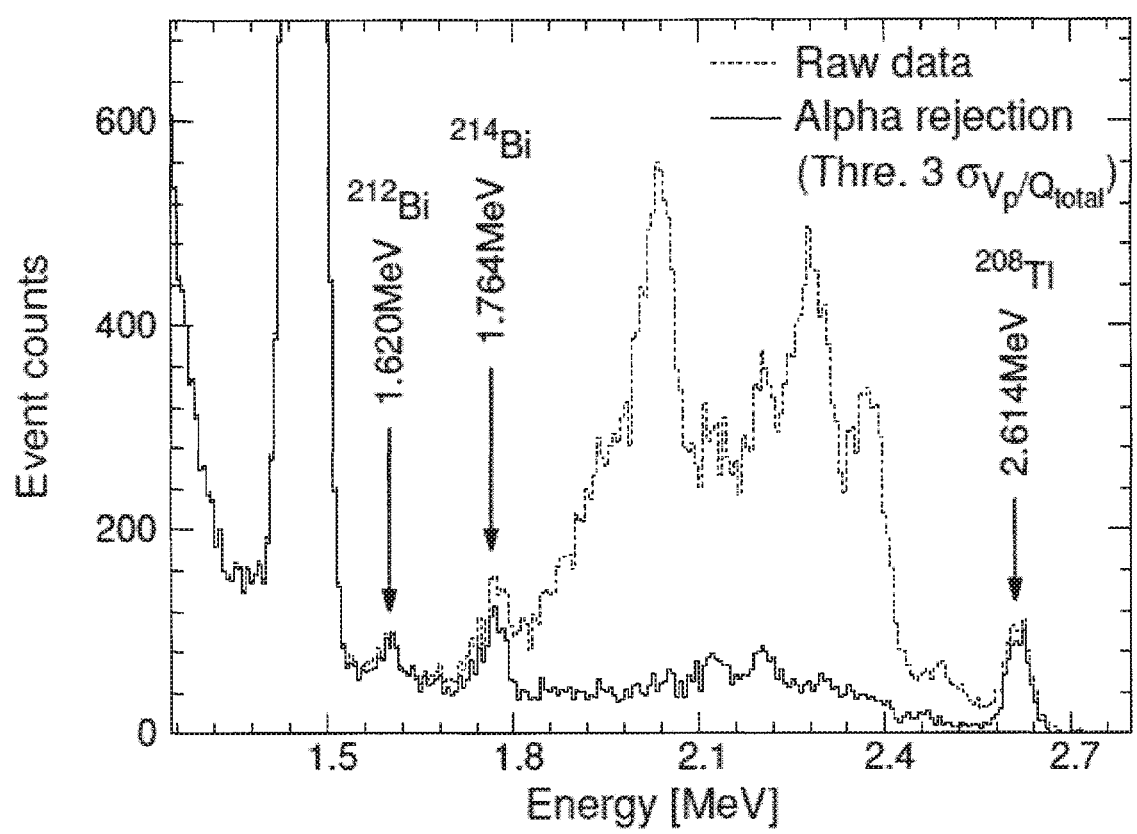
FIG. 11 is a diagram illustrating a result of rejecting an α ray event.
Figure 12:
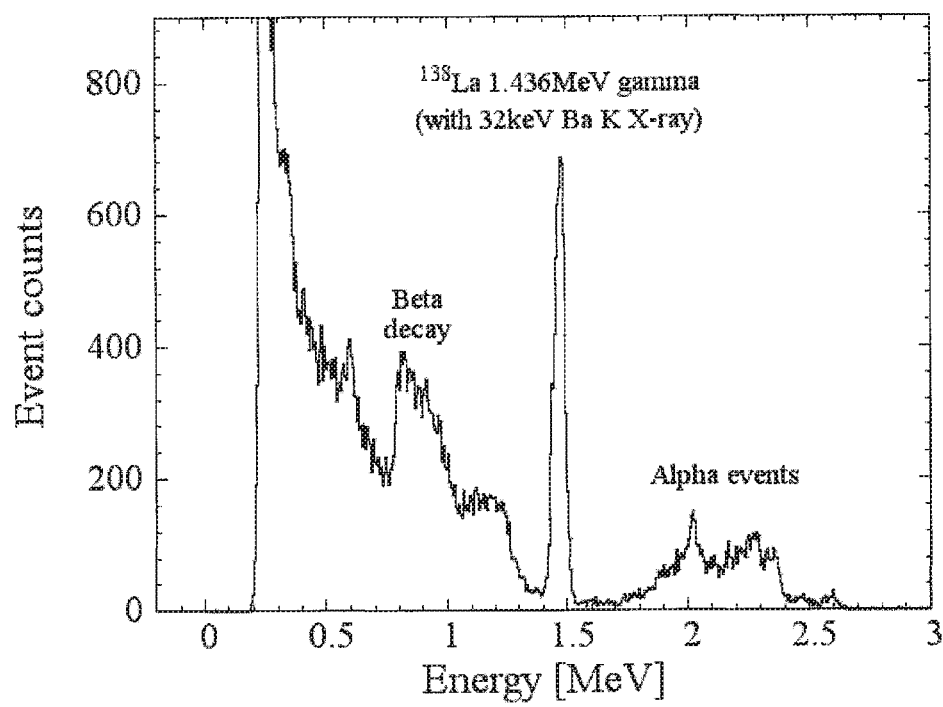
FIG. 12 is an energy spectrum diagram (part 2) of the LaBr$_3$:Ce scintillator.
Figure 13:
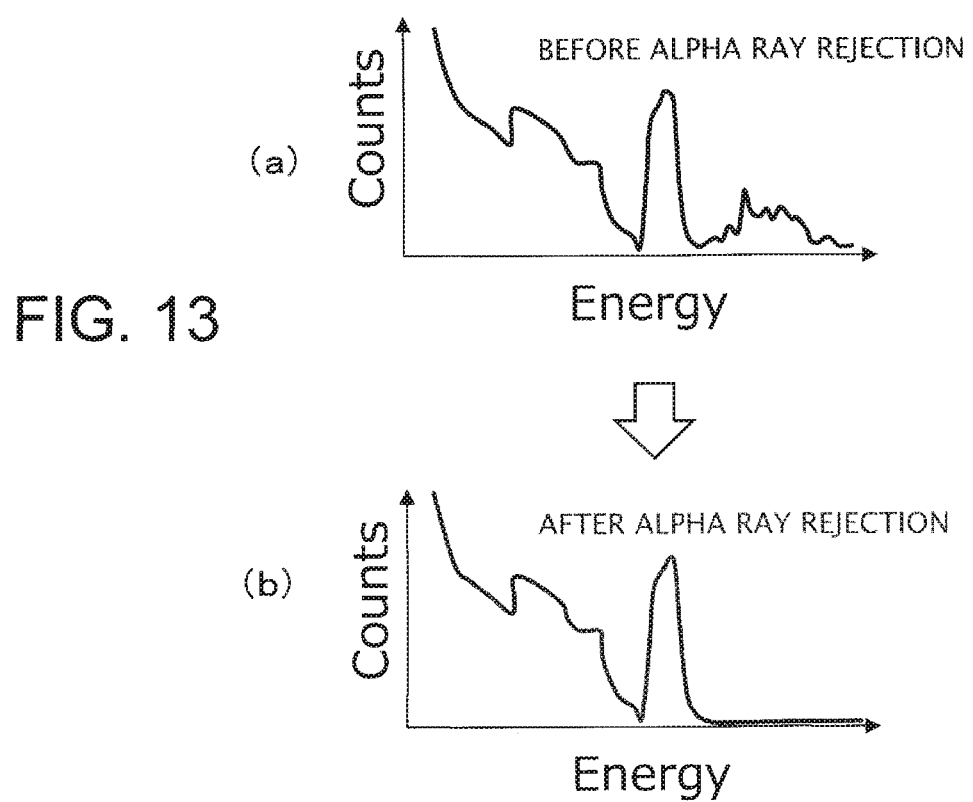
FIG. 13 is a schematic view for explaining α ray event rejection.

Further, in the exemplary embodiment, since $^{208}$Tl 2.6 MeV, which is an environmental radionuclide, may be contained as described above, nuclides of the same series may be mixed as well. FIG. 11 is a diagram illustrating a result when α ray events are rejected using $V_p/Q_{total}$ and the threshold function of 3σ by further increasing the statistical number. Very few events of $^{212,\ 214}$Bi have been identified.

In this regard, the method of the exemplary embodiment also has the effect of being able to remarkably detect even a small number of γ ray events.

As described above, according to the exemplary embodiment, only γ ray events may be collected by identifying α ray events using a measured value that can be actually measured in real time such as a peak voltage of the signal and a total charge amount, and rejecting the α ray events. Further, in the exemplary embodiment, it is possible to obtain the same result as that in the background (BG) subtraction method with higher accuracy. Further, in the exemplary embodiment, since measurement may be performed independently of the S/N ratio of the measurement target and the α decay background, it is also suitable for detection of very small signals. In the exemplary embodiment, attention is paid particularly to the α decay events included in the self-radioactivity, but it is applicable not only to self-radioactivity but also to α rays and heavy particle rays incident from the outside. That is, the exemplary embodiment is not necessarily limited to self-radioactivity and may be applied to the rejection of specific events that may exist in a specific energy range.

In the exemplary embodiment, since data are saved over several seconds for each event, the dead time tends to increase, but the dead time may be reduced by using a high-speed ADC for flash analog to digital converter (FADC) that acquires a signal waveform at high speed.

It is also possible to extract only the γ ray spectrum in real time by installing a processing program for implementing a process in the exemplary embodiment in a field programmable gate array (FPGA).

In the exemplary embodiment, α ray events are identified using $V_p/Q_{total}$, but it goes without saying that $Q_{total}/V_p$, which is the reciprocal thereof, may be used.

REFERENCE SIGNS LIST

10 LaBr$_3$:Ce scintillator, 12 photomultiplier tube, 14 oscilloscope, 16 hard disk, 18 computer.

The invention claimed is:

1. An LaBr$_3$ scintillation detector comprising:
   an LaBr$_3$ scintillator;
   a photoelectric converter configured to convert light emitted from the LaBr$_3$ scintillator into an electric signal;
   a waveform signal output unit configured to convert an output from the photoelectric converter into a voltage waveform signal;
   a detecting unit configured to detect a peak value $V_p$ and a total charge amount $Q_{total}$ of the voltage waveform signal;
   a calculating unit configured to calculate an error propagation expression function of a ratio of the peak value $V_p$ and the total charge amount $Q_{total}$ based on an energy range of 1.5 MeV and less for γ ray events; and
   a processing unit configured to use the error propagation expression function as a threshold function to specify an event other than γ rays and reject the event.

2. The LaBr$_3$ scintillation detector according to claim 1, further comprising:
   a low-pass filter configured to remove a high frequency component of the voltage waveform signal output from the waveform signal output unit.

3. The LaBr$_3$ scintillation detector according to claim 1, wherein the calculating unit is configured to calculate a standard deviation by correcting the peak value $V_p$ detected by the detector to become linear with respect to the total charge amount $Q_{total}$.

4. The LaBr$_3$ scintillation detector according to claim 1, wherein the processing unit is configured to use an error propagation expression function of 3σ as the threshold function.

5. The LaBr$_3$ scintillation detector according to claim 1, wherein the ratio of the peak value $V_p$ and the total charge amount $Q_{total}$ is $V_p/Q_{total}$.

6. The LaBr$_3$ scintillation detector according to claim 1, wherein the calculating unit is configured to correct the peak value $V_p$ detected by the detector to become linear with respect to the total charge amount $Q_{total}$, and the processing unit is configured to use an error propagation expression function of 3σ as the threshold function.

7. The LaBr$_3$ scintillation detector according to claim 1, wherein the LaBr$_3$ scintillator is the single scintillator of the detector.

8. A method of rejecting a specific event of an LaBr$_3$ scintillator, the method comprising:
   converting an emission of the LaBr$_3$ scintillator into a voltage waveform signal and outputting the voltage waveform signal;
   detecting a peak value $V_p$ and a total charge amount $Q_{total}$ of the voltage waveform signal;
   calculating a standard deviation of a ratio of the peak value $V_p$ and the total charge amount $Q_{total}$ and calculating an error propagation expression function of the standard deviation in an energy range of 1.5 MeV and less for only γ ray events; and
   specifying an event in an energy range of 1.5 MeV or more using the error propagation expression function as a threshold function and rejecting the event.

* * * * *